United States Patent
Vu et al.

(10) Patent No.: US 7,936,691 B2
(45) Date of Patent: May 3, 2011

(54) REPLICATION OF STATIC AND DYNAMIC DATABASES IN NETWORK DEVICES

(75) Inventors: Kim Vu, San Jose, CA (US); Raj Sarkar, Ann Arbor, MI (US); Saeed Nekoomaram, San Mateo, CA (US); Prakash Jayaraman, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 1533 days.

(21) Appl. No.: 11/093,719

(22) Filed: Mar. 29, 2005

(65) Prior Publication Data

US 2006/0209678 A1 Sep. 21, 2006

Related U.S. Application Data

(60) Provisional application No. 60/657,634, filed on Feb. 28, 2005.

(51) Int. Cl.
*G01R 31/08* (2006.01)
*G06F 17/00* (2006.01)
*G06F 7/00* (2006.01)

(52) U.S. Cl. ......... 370/252; 707/610; 707/617; 707/634

(58) Field of Classification Search .................. None
See application file for complete search history.

(56) References Cited

U.S. PATENT DOCUMENTS 6,847,991 B1 * 1/2005 Kurapati .................. 709/213
2002/0194015 A1 * 12/2002 Gordon et al. ................ 705/1

* cited by examiner

*Primary Examiner* — Seema S Rao
*Assistant Examiner* — Christine Duong
(74) *Attorney, Agent, or Firm* — Townsend and Townsend and Crew LLP

(57) ABSTRACT

Methods, apparatuses, and systems are presented for replicating data from a first network device to a second network device involving selecting a plurality of data sections containing data accessed by the first network device, systematically assigning at least one replication attribute to each of the plurality of selected data sections, and replicating the plurality of selected data sections from the first network device to the second network device, to create a replicated version of the plurality of selected data sections accessible by the second network device, wherein replication of each of the plurality of selected data sections is performed in accordance with the at least one replication attribute assigned to the selected data section.

21 Claims, 9 Drawing Sheets

| Session Number | input interface | user name | instance ID | ... |
|---|---|---|---|---|
| 1 | 1.2.100.32 | joe@msn.com | 52AB3D39 | |
| 2 | 3.1.82.24 | ann@aol.com | 4D825B68 | |
| 3 | | | | |
| | | | | |

FIG. 4

| session number | connection interface ID | virtual domain ID | ... |
|---|---|---|---|
| 1 | 1.2.100.32 | 81B6 | |
| 2 | 3.1.82.24 | 2A39 | |
| 3 | | | |
| | | | |

FIG. 5

| session number | flow ID | queue ID | ... |
|---|---|---|---|
| 1 | 1 | 58 | |
| 1 | 2 | 137 | |
| 1 | 3 | 14 | |
| 1 | 4 | 25 | |
| 1 | 5 | 94 | |
| 1 | 6 | 8 | |
| 2 | 3 | 72 | |
| 2 | 5 | 31 | |
| 3 | 1 | 60 | |
| | | | |

| XXXX | XXXX | XXXX | XXXX |
|------|------|------|------|
| XXXX | XXXX | XXXX | XXXX |
| XXXX | XXXX | XXXX | XXXX |
| XXXX | XXXX | XXXX | XXXX |
| XXXX | XXXX | XXXX | XXXX |

FIG. 7

REPLICATION OF STATIC AND DYNAMIC DATABASES IN NETWORK DEVICES

CROSS-REFERENCES TO RELATED APPLICATIONS

This application is a non-provisional application of U.S. Provisional Patent Application No. 60/657,634 filed Feb. 28, 2005.

BACKGROUND OF THE INVENTION

Network communication protocols provide the foundation for transferring data across networks. When equipment such as software and hardware that implement network communication protocols experience failure, communication links may be degraded or even terminated all together. Even if a system is capable of recovery, the transfer of data may experience significant interruptions while communication links are re-established. Such interruptions may represent serious and unacceptable degradations to the performance of the system.

One example of a network communication protocol susceptible to breakdowns is the Point-to-Point Protocol (PPP). PPP is a widely adopted protocol for transporting data packets over a link between two nodes. In the well known Open System Interconnection (OSI) model of layers of network communications, PPP is commonly described as a layer two, or data link layer, protocol. PPP supports different types of layer three, or network layer protocol, by encapsulating data from such network layer protocols into PPP frames and transporting them between the nodes. Network layer protocols supported by PPP include the Internet Protocol (IP), Internetwork Packet Exchange (IPX), and NetBIOS Frames (NBF). PPP also supports other frame types such as Asynchronous Transfer Mode (ATM) and Ethernet. A PPP session established between a home computer and equipment of an Internet Service Provider (ISP) may support the transfer of IP packets. Over the PPP session, the ISP may forward IP packets received from the Internet to the home computer, as well as forward IP packets received from the home computer to the Internet. In this manner, the ISP may serve as a conduit that connects the home computer to the Internet. Such a scenario is characteristic of "dial-up" and Digital Subscriber Line (DSL) services for Internet access provided by ISPs.

PPP may serve as a crucial link in a wide range of different network communication scenarios. An unintended breakdown of a PPP session likely leads to disruption or failure of higher level communications which depend on the PPP session. Re-establishment of the PPP session may allow the network communication to resume in certain implementations. However, it may take a significant amount of time to re-establish a PPP session, as well as higher level network communications supported by the PPP session. This potential problem may be especially troubling for real-time applications in which network communication is expected to transfer a stream of time-sensitive information. For example, a voice-over-IP (VoIP) phone call may be established using IP packets transferred over a PPP session. Such a call may suffer a call drop or a significant period of interruption if an underlying PPP session breaks down during the call. Even for non-real time applications, failures or interruptions associated with the break down of a PPP session can nevertheless cause serious degradations to network system performance. There is an urgent need for techniques that allow communication links, such as a PPP session, to be preserved without interruption in the event of equipment failure in a system.

Furthermore, a system that replicates data in network devices to maintain communication links may encounter many different data structures utilized by a wide range of processes. The variation in the types of data replicated and types of processing involved can lead to a complicated and error-prone replication procedure. Accordingly, there is also a considerable need for improved techniques for replicating different types of data in network devices.

BRIEF SUMMARY OF THE INVENTION

The present invention relates to methods, apparatuses, and systems for replicating data from a first network device to a second network device involving selecting a plurality of data sections containing data accessed by the first network device, systematically assigning at least one replication attribute to each of the plurality of selected data sections, and replicating the plurality of selected data sections from the first network device to the second network device, to create a replicated version of the plurality of selected data sections accessible by the second network device, wherein replication of each of the plurality of selected data sections is performed in accordance with the at least one replication attribute assigned to the selected data section.

In one embodiment, each of the plurality of data sections is a row in a two-dimensional data structure. In another embodiment, each of the plurality of data sections is a column in a two-dimensional data structure. In yet another embodiment, each of the plurality of data sections is a two-dimensional data structure.

The at least one replication attribute may comprises, for example, an attribute relating to whether the data selection is to be replicated, an attribute relating to whether the data section is persistently stored, an attribute relating to whether the data section is to be forwarded to a process operating on the second network device, and/or an attribute relating to whether replication of the data section involves an acknowledgement relating to receipt of the data section at the second network device. The at least one replication attribute may further comprises an attribute relating to whether an acknowledgment is handled asynchronously with respect to other acknowledgements.

According to one embodiment of the invention, the at least one replication attribute comprises a plurality of replication attributes. In addition, the at least one replication attribute may comprise a predefined value representing a combination of replication attribute values.

BRIEF DESCRIPTION OF THE DRAWINGS

FIG. 4 presents an illustrative session table that is maintained by a PPP control module on an active control plane and is replicated to a corresponding PPP control module on a standby control plane, according to one embodiment of the present invention.

FIG. 5 presents an illustrative connection table that is maintained by a service control module on an active control plane and is replicated to a corresponding service control module on a standby control plane, according to one embodiment of the present invention.

FIG. 6 presents an illustrative circuit table that is maintained by a service control module on an active control plane and is replicated to a corresponding service control module on a standby control plane, according to one embodiment of the present invention.

FIG. 7 depicts a generalized two-dimensional data structure representing data that may be replicated in accordance with one embodiment of the present invention.

DETAILED DESCRIPTION OF THE INVENTION

PPP Session Preservation Using Redundant System

Figure 1:
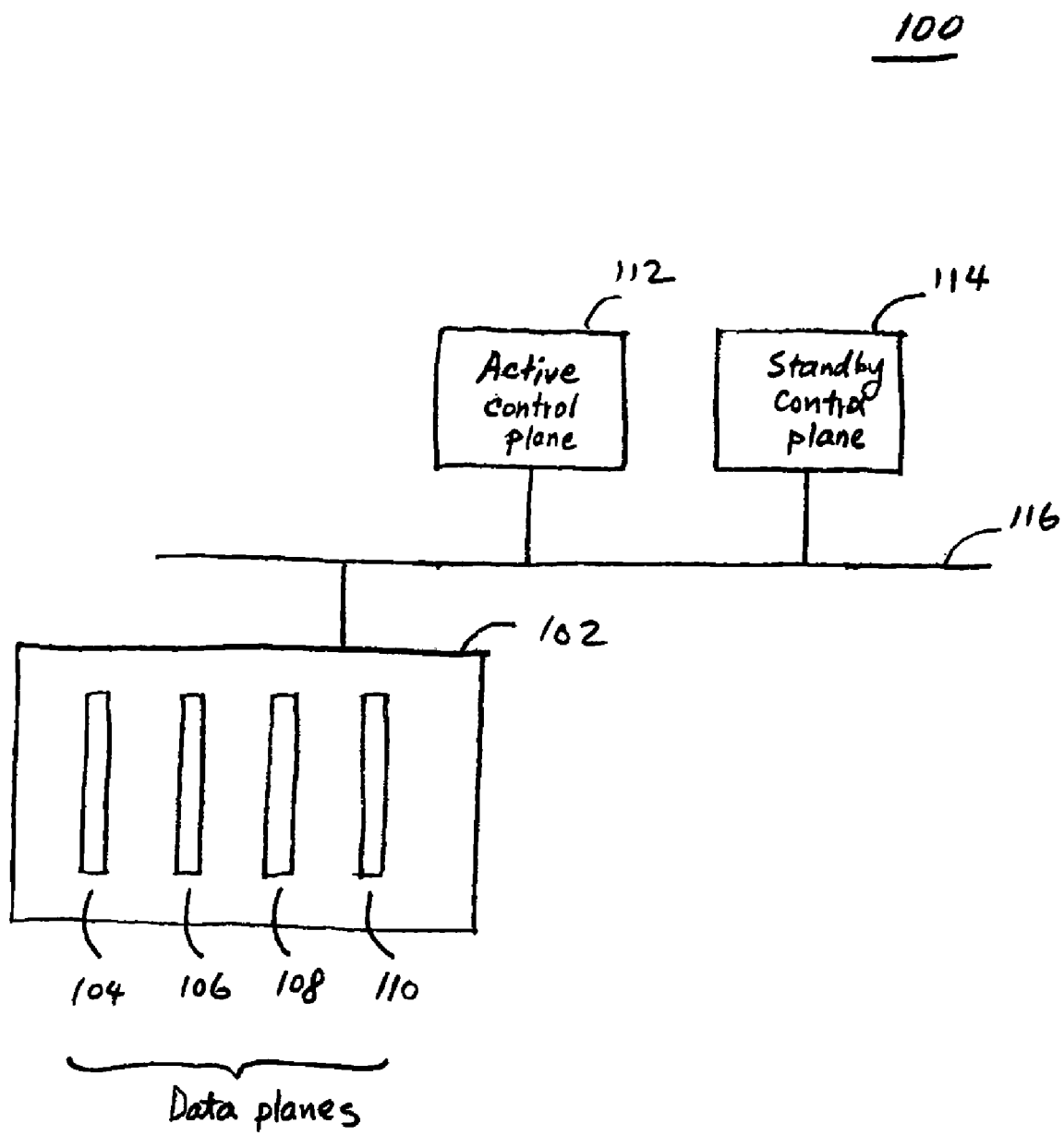
FIG. 1 is a simplified diagram of a network access device capable of preserving PPP sessions using redundant resources in accordance with one embodiment of the present invention.

FIG. 1 is a simplified diagram of a network access device 100 capable of preserving PPP sessions using redundant resources in accordance with one embodiment of the present invention. In the present embodiment, network access device 100 is capable of providing access to individual users so that they can be connected to a larger computer network, such as the Internet. For instance, network access device 100 may be employed by an internet service provider (ISP) to provide Internet access for a plurality of users using individual personal computers. In this case, the network access device 100 may be considered a local node and an individual's personal computer may be considered a remote node in the PPP session. Alternatively, if viewed from the perspective of the individual user, the personal computer may be viewed as the local node and network access device 100 may be considered a remote node in the PPP session. One example of a network access device may be a broadband remote access device (BRAS) that is used to provide services such as DSL to many users. Here, network access device 100 operates by establishing PPP connections with each user's personal computer. Over each PPP connection, network access device 100 forwards IP packets received from the Internet to the user's computer, as well as IP packets received from the user's computer to the Internet. In this manner, network access device 100 provides Internet access to the multiple users.

As shown in the figure, network access device 100 includes a chassis 102 that contains a number of data planes 104, 106, 108, and 110. Network access device 100 also includes two control planes 112 and 114. In the present embodiment of the invention, network access device 100 utilizes a "split-plane" architecture which segregates or splits data forwarding functions from routing functions. Such a split-plane architecture includes at least one data plane and at least one control plane. The data plane typically performs the actual forwarding of packets of data, and the control plane controls the operations of the data plane. For example, the control plane may determine and control how a packet is to be routed or forwarded. In the context of a PPP connection, the control plane may process PPP control packets and configure the data plane to establish, maintain, terminate, or otherwise conduct the PPP connection.

Here, each data plane includes a number of ports. A port on a data plane may exchange data with another port on the same data plane or a port on a different data plane. A control plane controlling the data planes may maintain a route table that includes the routes involving the different ports on the data planes. These tables may be used to configure the data planes to properly forward data to reflect the various routes. For example, a source data plane may send data received at a port to another port on the same data plane or a different data plane according to a particular route in the route table. Each data plane may handle multiple data for multiple routes.

According to the present embodiment of the invention, each of the data planes 104, 106, 108, and 110 is implemented as an individual printed circuit board (PCB) module located in chassis 102. Each of these PCB modules may comprise a variety of different components, as is known in the art. Also according to the present embodiment of the invention, each of the control planes 112 and 114 is implemented as one or more software programs executed by a computer system having one or more central processing units (CPUs) and an operating system. The control planes and data planes may communicate using a suitable communication protocol over one or more connections 116. Examples of such protocols include Ethernet, Gigabit Ethernet, Optical Carrier level three (OC3) protocol, and others.

Although in the present embodiment, data planes are generally implemented in hardware and control planes are generally implemented in software, other configurations are possible. Each data plane or control plane may be implemented in various combinations of hardware and/or software, such as application-specific integrated circuits (ASICs), programmable devices, logic circuits, and different types firmware and software. Also, while data planes and control planes may be implemented in the present embodiment using separate physical devices, in other embodiments data planes and control planes may be implemented as equipment contained in a common physical device.

Figure 2:
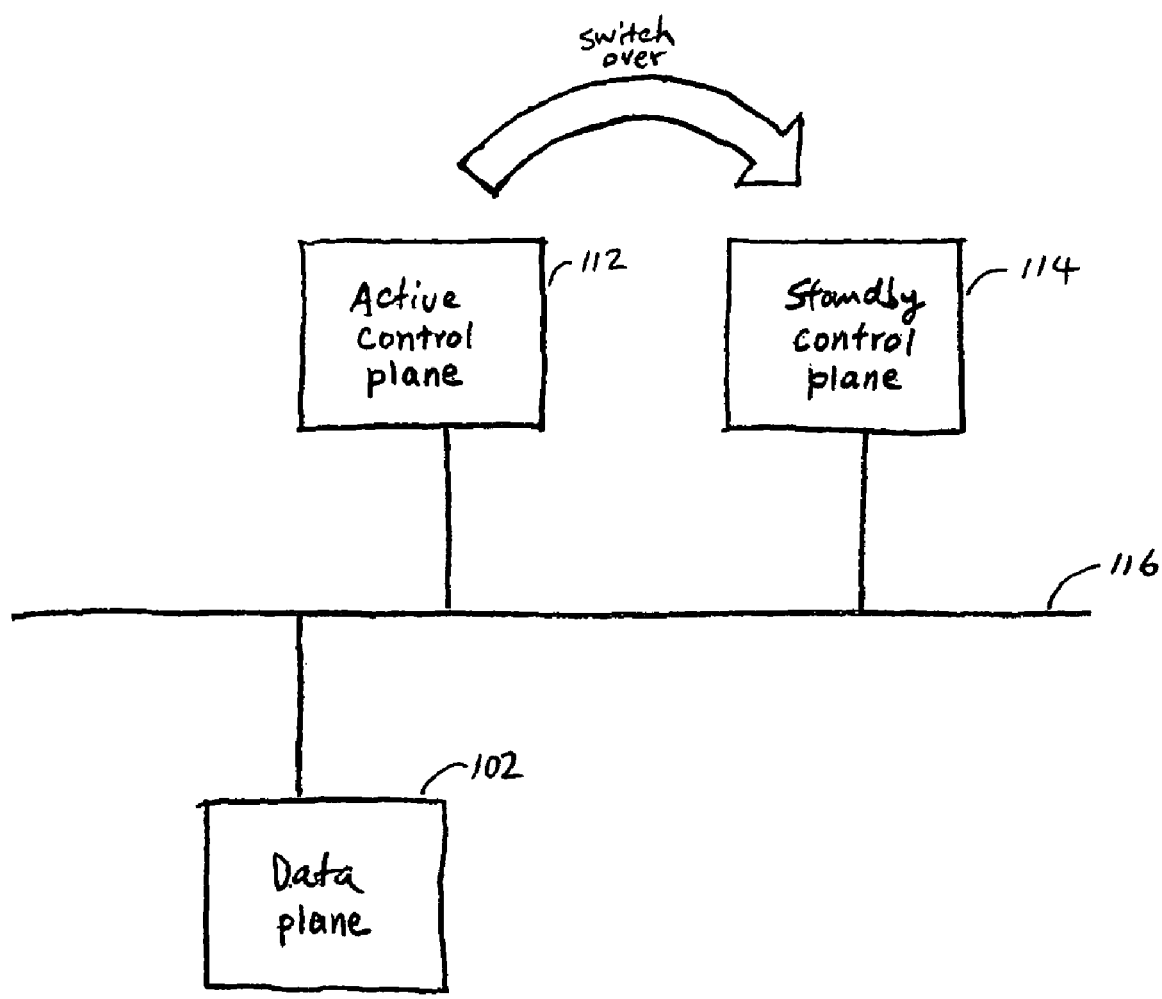
FIG. 2 is a diagram depicting the switch over from an active control plane to a standby control plane during a PPP session, in accordance with one embodiment of the present invention.

FIG. 2 is a diagram depicting the switch over from an active control plane to a standby control plane during a PPP session, in accordance with one embodiment of the present invention. As shown in the figure, active control plane 112 may be controlling data plane 102 in conducting a live PPP session. Certain information relating to this and possibly other PPP sessions maybe replicated from active control plane 112 to standby control plane 114 prior to the switch over. The replication of this information may take place at different stages, such as at the beginning of each PPP session, during each PPP session, and/or at other times. The replicated information may be used to allow switch over to take place such that the control of data plane 102 in conducting one or more PPP sessions may be transferred from active control plane 112 to standby control plane 114 without interrupting PPP sessions already in progress. While only one data plane 102 is shown in FIG. 2, there may be multiple data planes being controlled by active control plane 112. Switch over from active control plane 112 to standby control plane 114 may allow control plane 114 to take over the control of the multiple data planes.

In the present embodiment of the invention, the ability to switch over from an active control plane to a standby control plane provides redundancy to protect against failures that can result from conditions such as overloading, equipment malfunction, etc. For example, according to the present embodiment, active control plane 112 may be implemented as software executed in a computer system that comprises one or more CPUs and an operating system. Such a computer system may experience different types of failures. These failure may or may not be related to the operation of active control plane 112. Just as an example, other applications, or the operating system itself, may encounter an error that hangs the computer system. Even if a failure is not directly associated with the operation of active control plane 112, such a failure can nevertheless affect the computer system and thus render active control plane 112 partially or completely inoperative. According to the present embodiment of the invention, in the event of such failures, control may be transferred from active control plane 112 to standby control plane 114 to preserve PPP sessions that may otherwise be disconnected as a result.

Figure 3:
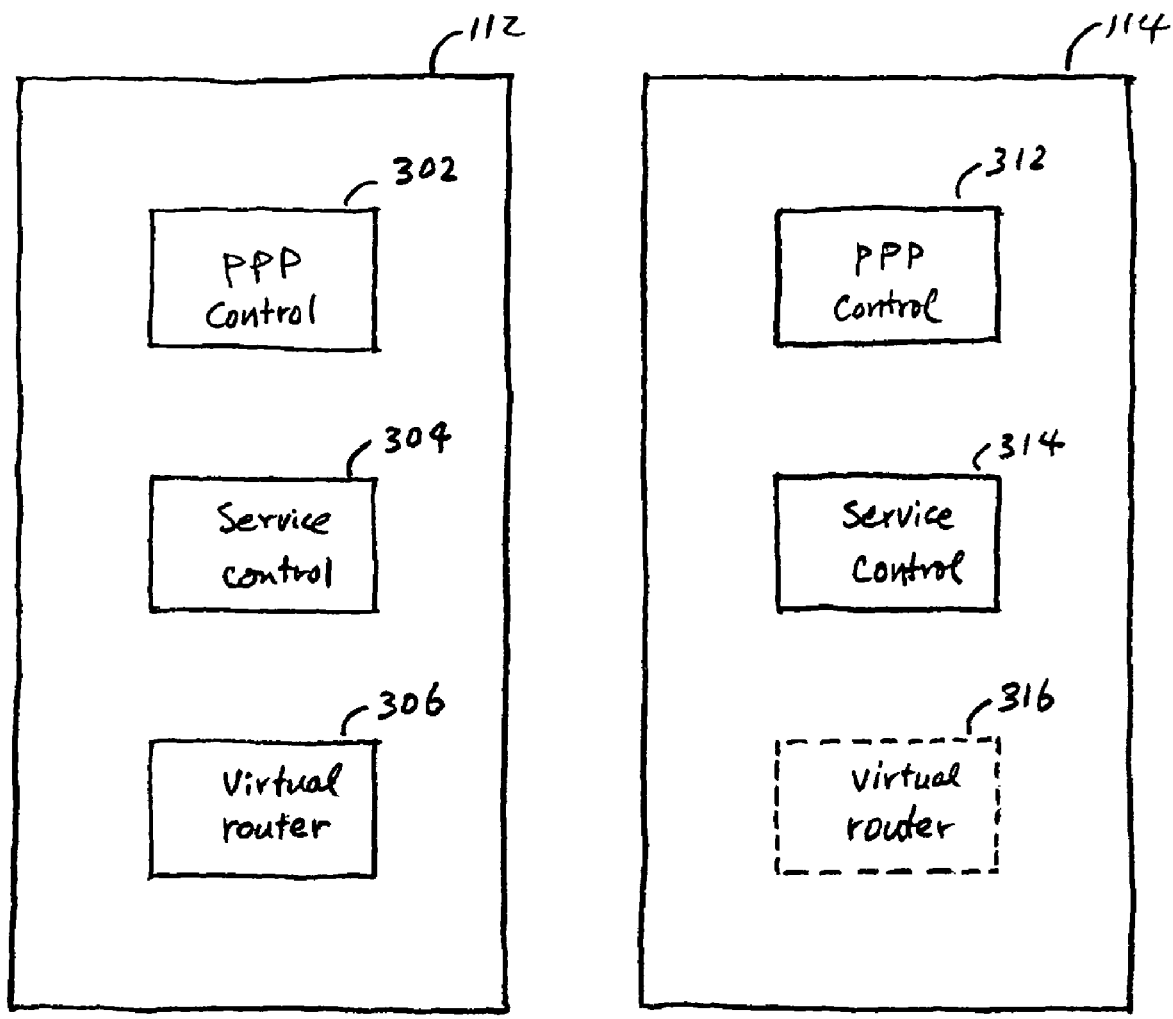
FIG. 3 presents illustrative software components that may be included in each control plane, in accordance with one embodiment of the invention.

FIG. 3 presents illustrative software components that may be included in each control plane, in accordance with one embodiment of the invention. As shown, active control plane 112 comprises a PPP control module 302, a service control module 304, and a virtual router module 306. These software components operate together with data planes such as data plane 102 to conduct one or more PPP sessions that may allow users to connect to computer networks. In this embodiment, PPP control module handles general tasks associated with establishing, maintaining, and terminating various PPP sessions. Service control module 304 manages details of various operations of the PPP sessions, such as the control of specific services provided in association with the PPP sessions. Virtual router 306 handles the routing of connections based on the PPP sessions with networking layer entities. Standby control plane 114 may contain similar software components. Specifically, standby control plane 114 is shown in FIG. 3 to include a PPP control module 312, a service control module 314, and a virtual router module 316. The various software components depicted in FIG. 3 are shown for illustrative purposes. It should be understood that different software components may be added, deleted, substituted, or otherwise modified as is known in the art.

While active control plane 112 is operating to conduct live PPP sessions, at least some of the components of standby module 114 may already be operating. That is, portions of standby control plaint 114 need not wait until switch over time to begin their operations. They may already be configured and operating by the time switch over occurs. Thus, upon switch over, standby control plane may quickly take over tasks previously handled by active control plane 112. This allows the standby control plane 114 to take over control of PPP sessions with minimal delay, which can significantly reduce the amount of interruption to the PPP sessions. For example, PPP control module 312 and session control module 314 may already be executing in standby control plane 114 while active control plane 112 is operating normally.

On the other hand, according to at least one embodiment of the invention, there may be other components in standby control plane 114 that do not become operational until a switch over has taken place. For example, virtual router module 316 may not be executed in standby control plane 114 until a switch over has begun. Here, virtual module 306 handles certain attributes of PPP sessions that may not need to be immediately made available upon a switch over. In this example, the virtual router module manages session attributes such as authentication, access control lists (ACLs), and rate limiting. Also, the virtual router module populates the routing table for routing connections associated with PPP sessions with other network layer entities. In the present embodiment of the invention, these may be properties that are primarily used for establishing the PPP sessions. For instance, when various PPP sessions are first established, data plane 102 may be configured to forward data according to these properties. Thereafter, data plane 102 may continue to maintain the PPP sessions, so configured, even when control of data plane 102 is switched from active data plane 112 to standby control plane 114. Data plane 102 thus maintains routes previously established by active control plane 112, even as control is passed from active control plane 112 to standby control plane 114. Thus, while virtual router module 306 is used to initialize the PPP sessions, a corresponding virtual router module 316 may not be required to be already in operation upon switch over from active control plane 112 to standby control plane 114.

Furthermore, certain characteristics of a PPP session not immediately known on standby control plane 114 may be set to default settings upon switch over. At a later time, those characteristics may be re-established for the PPP session. In one illustrative implementation, virtual router module 316, which is responsible for managing access control lists and rate limiting, is not yet operating in standby control plane 114 upon a switch over from active control plane 112. In that case, a PPP session having particular ACL settings and rate-limiting settings may be configured to default values upon the switch over. For example, a default ACL setting may require a standard level of filtering of data traffic based on web site addresses. A default rate-limiting setting may allow only a relatively low data rate sufficient for general web surfing use. When virtual router module begins to operate in standby control plane 114, the particular ACL and rate-limiting setting for the PPP session may be returned to their previous values.

According to various embodiments of the invention, information may be replicated from active control plane 112 to standby control plane 114 prior to the switch over to ensure a smooth transition of control. For example, certain information accessed by PPP control module 302 and service control module 304 may be replicated to PPP control module 312 and service control module 314 before the switch over takes place. The manner of storage for such information may vary depending on implementation. According to the present embodiment, the information is initially stored in data structures accessed by PPP control module 312 and service control module 314 of active control plane 112. Such data structures may include persistent and/or non-persistent data structures. For example, some data may be stored onto hard disk space such that the data will be maintained even if the control plane is re-started. Some data may be stored only in main memory (e.g., RAM) by the control plane such that when the control plane is re-started, the data is lost. Other types of data may be stored both on hard disk as well in main memory. Also, the location of memory devices may vary depending on implementation. In the present embodiment, active control plane 112 and standby control plane 114 are implemented on separate computer systems each having its own main memory and hard disk. In other implementations, memory storage device may be located at different locations or at a common location.

FIG. 4 presents an illustrative session table 400 that is maintained by PPP control module 302 on active control plane 112 and is replicated to corresponding PPP control module 312 on standby control plane 114, according to one embodiment of the present invention. Session table 400 includes a row of data for each live PPP session controlled by active control plane 112. As shown in the figure, session table 400 includes a number of columns that contain information describing each PPP session. A column labeled "input interface" contains a piece of 4-tuple data (e.g., "1.2.100.32") that identifies a specific input interface associated with the PPP session. Specifically, the first part of the 4-tuple data identifies a specific data plane, such as data plane 104. The second part of the 4-tuple data identifies a particular port on the identified data plane. The third part of the 4-tuple data describes a virtual path identifier (VPI) that identifies a particular subdivision of the identified port. The fourth part of the 4-tuple of data describes a virtual channel identifier (VCI) that identifies a further subdivision of the specified VPI. Thus, the 4-tuple data specifically identifies the input interface associated with each PPP session. Table 400 also includes another column labeled "user name." This column identifies the name of the user that is using the PPP session. The user name may be specified as an email address. For example, a user name may be "joe@msn.com." Table 400 further includes a column labeled "instance ID." This column provides a unique identifier for the specific instance of a PPP session. For example, if a particular PPP session is terminated and re-started, a new instance ID may be assigned, even though the connection is simply a new instance of a previously existing PPP session. The instance ID allows the control plane to specifically identify each instance of a PPP session.

There may also exist data structures utilized by active control plane 112 that are not replicated to standby control plane 114. In the present embodiment of the invention, PPP control module 302 also maintains a data structure referred to here as a PPP stack that may contain rapidly changing information relating to each PPP session. For example, a PPP stack may store PPP control packets received at network access device 100 from another entity, such as a user's computer. These control packets may include request packets requesting establishment of a PPP session, ECHO packets requesting a response to verify proper operation of a PPP sessions, termination packets requesting termination of a PPP session, and so on. In addition, the PPP stack may include state information relating to the present state of each PPP session. In accordance with the present embodiment of the invention, information contained in such a PPP stack is not replicated from active control plane 112 to standby control plane 114. Instead, standby control plane 114 is capable of taking over control of the live PPP sessions without replication of the PPP stack information. Standby control plane 114 is able to sufficiently re-create such PPP stacks from available information that is replicated from active control plane 112. For example, in one implementation, PPP session table 400 identifies all existing live PPP sessions. Standby control plane 114 may be able to infer from PPP session table 400 which PPP sessions are currently operating in an active state. While PPP stack information is not replicated to the standby control plane in this embodiment, such information may be replicated in other embodiments.

In one embodiment of the, PPP control packets received during the switch over process may be held temporarily and processed at a later time, when switch over is complete. For example, PPP control packets received by network access device 100 during switch over from active control plane 112 to standby control plane 114 may be held at the data plane at which the control packet arrived and forwarded to the standby control plane 114 after control has been transferred to standby control plane 114. In one simplified implementation, control packets for existing PPP sessions received during switch over are assumed to be control packets requesting termination of the relevant PPP session. Accordingly, standby control plane 114 may terminate PPP sessions for which control packets were received during the switch over process.

Furthermore, the data plane may also record changes to PPP sessions during switch over and forward such information to standby control plane 114 after switch over is complete. For example, data plane 104, as well as other data planes, may operate an ECHO module that sends ECHO requests to another entity and responds to ECHO requests from such an entity to ensure a PPP connection remains active, as in known in the art. Operation of data plane 104, including the ECHO module, may continue throughout the switch over process. If during switch over data plane 104 detects by operation of the ECHO module that a particular PPP session has been disconnected (i.e., by lack of a PPP ECHO response from the other entity), data plane 104 may record the disconnected PPP session and inform standby control module 114 of the disconnection once the switch over process is complete. At that point, standby control module 114, which has become active, may properly terminate the disconnected PPP session.

FIG. 5 presents an illustrative connection table 500 that is maintained by service control module 304 on active control plane 112 and is replicated to corresponding service control module 314 on standby control plane 114, according to one embodiment of the present invention. Connection table 500 contains different columns that provide information on each PPP sessions. For example a column labeled "connection interface ID" identifies the connection interface for each PPP sessions. In one embodiment, this may be the same identifier as the "input interface" identifier described previously with respect to table 400. Thus, the connection interface ID may be expressed as the 4-tuple that uniquely identifies the input interface associated with each PPP session. Connection table 500 also includes a column labeled "virtual domain ID." This column contains an identifier that identifies a particular virtual domain routing table that is utilized by the virtual router module, such as virtual router modules 306 and 316, to establish network layer connection based on the individual PPP sessions.

FIG. 6 presents an illustrative circuit table 600 that is maintained by service control module 304 on active control plane 112 and is replicated to corresponding service control module 314 on standby control plane 114, according to one embodiment of the present invention. Circuit table 600 provides information on individual circuits established based on active PPP sessions. Each PPP session may support multiple circuits, or "flows," that may separately carry data. According to the present embodiment of the invention, six classes of flows may be available. Each class may represent a different quality of service (QoS) that is provided for data transmission. Each class may represent a particular combination of priority, bandwidth, security, and/or other attributes that uniquely define the class. For example, a user may utilize one flow belonging to the lowest class for general web surfing use. Over the same PPP session, the user may utilize another flow belonging to a higher class for an voice-over-IP (VoIP) phone call. Data flows of different classes may thus be established over a PPP session to provide differentiated levels of network access. As shown in the figure, each PPP session may have one or more flows operating thereon.

Circuit table 600 also includes a column labeled "queue identifier" that identifies a particular queue implemented on the data plane for forwarding data packets from network layer entities to various PPP connections. According to the present embodiment of the invention, each queue may be characterized by its own bandwidth parameters. A range of different queues thus provides paths of different bandwidths onto which data packets may be forwarded to await transmission through the appropriate PPP connection. Such an implementation allows for efficient processing of data packets belonging to different classes.

Systematic Replication of Static and Dynamic Databases

According to at least one embodiment of the invention, replication of data from a source network device to a destination network device may be efficiently performed by adopting a systematic process. Here, a network device refers to an entity that may be implemented in software, hardware, or a combination of software or hardware. In the context of redundant systems, the source network device may be an active device, and the destination network device may be a standby device that can provide redundancy in case of failure of the active device. For example, the replication of information from active control plane 112 to standby control plane 114 involves data from many different data structures utilized by a wide range of processes. Generally speaking, such variation in the types of data replicated can lead to a complicated and error-prone replication procedure, if replication is implemented in an ad hoc manner. By utilizing defined attributes for characterizing various aspects of data relevant to replication, the replication procedure itself may be effectively streamlined. Further, techniques for replication of data in accordance with embodiments of the present invention may have broad applications beyond the implementation of redundant systems.

FIG. 7 depicts a generalized two-dimensional data structure 700 representing data that may be replicated in accordance with one embodiment of the present invention. According to the present embodiment, data that is to be replicated may be abstracted as one or more two-dimensional data structures such as structure 700. This may be done for different types of replicated data utilized by different processes. For example, each of the previously mentioned tables 400, 500, and 600 replicated from active control plane 112 to standby control plane 114 may be viewed as having the form of data structure 700. This generalized approach allows replicated data to be treated in a well-controlled and systematic fashion. Here, data structure 700 may be viewed as a table having rows and columns. Each table may contain a number of rows, and each row may contain a number of columns. According to one embodiment of the invention, the granularity of replication may be provided at the level of rows, or alternatively, at the level of columns. In other words, specific rows may be selected to be replicated to from a source to a destination. Also, specific columns of data may be selected to be replicated from a source to a destination.

Figure 8:
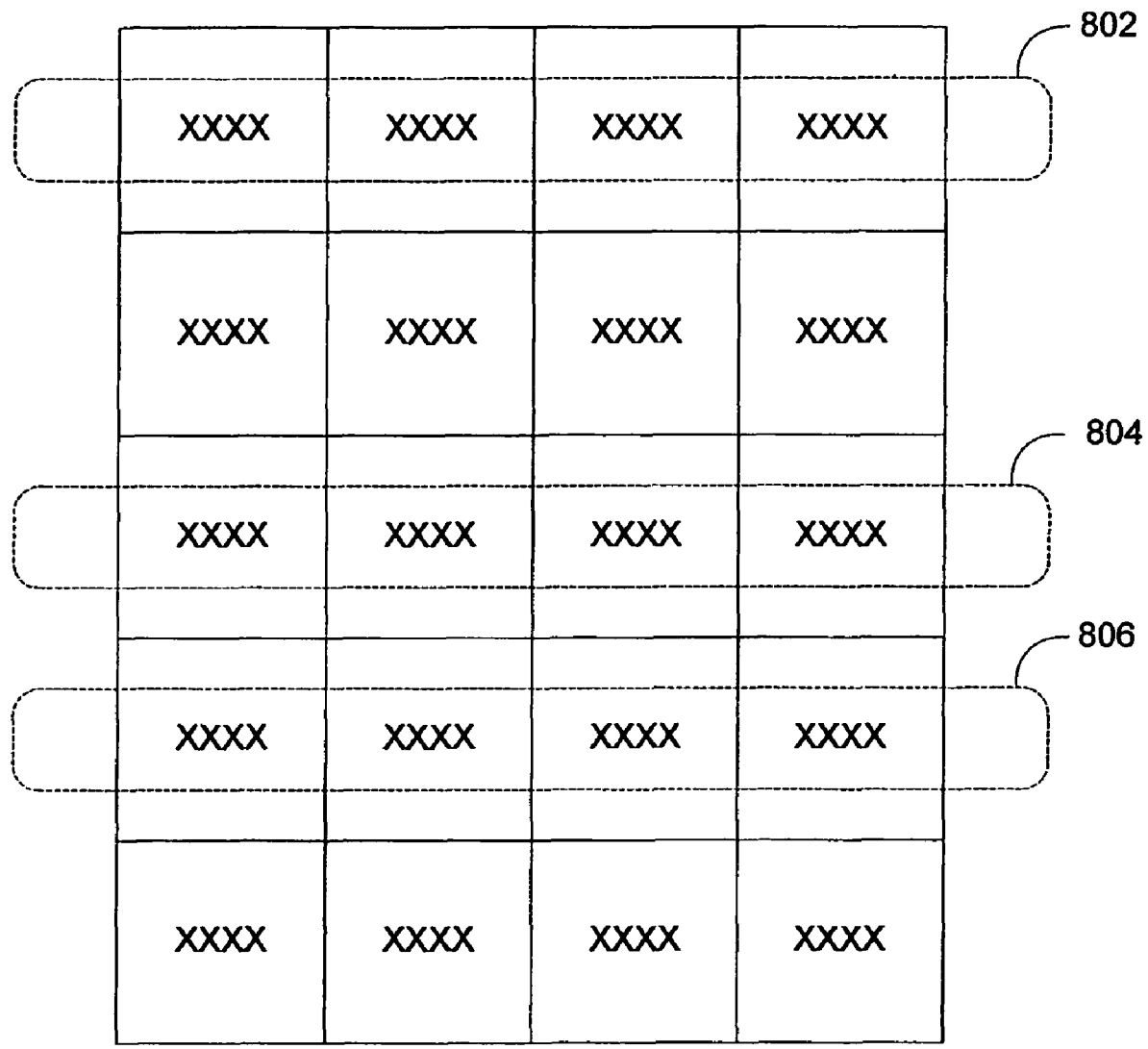
FIG. 8 depicts the selection of certain rows in a data structure for replication, according to one embodiment of the invention.

FIG. 8 depicts the selection of certain rows in data structure 700 for replication, according to one embodiment of the invention. As shown in this figure, rows 802, 804, and 806 are selected to be replicated from the source device to the destination device. The selection of these particular rows for replication may be systematically represented using attributes assigned to each row, as described in further detail below. Attributes may also defined for each row to further specify particular aspects of the data replication procedure as applied to each row.

Figure 9:
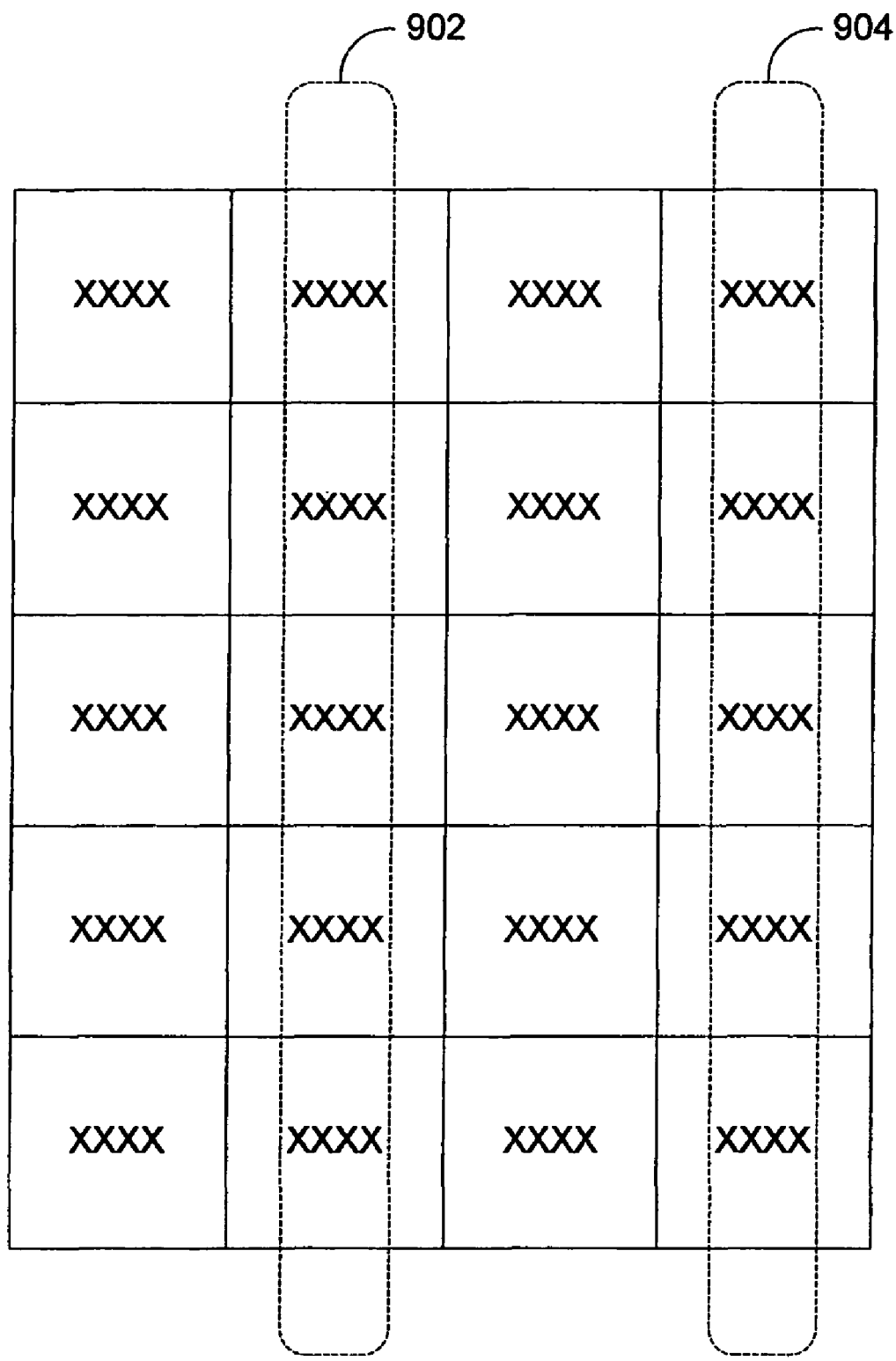
FIG. 9 depicts the selection of certain columns in a data structure for replication, according to another embodiment of the invention.

FIG. 9 depicts the selection of certain columns in data structure 700 for replication, according to another embodiment of the invention. As shown in this figure, columns 902 and 904 are selected to be replicated from the source device to the destination device. The selection of these particular columns for replication may be systematically represented using attributes assigned to each column, as described in further detail below. Attributes may also defined for each column to further specify particular aspects of the data replication procedure as applied to each column.

In other embodiments, selection of a section of data to be replicated needs not be restricted to the selection of rows or columns. For example, an entire table may be selected to be replicated from the source device to the destination device. In such a case, attributes may also be defined for the entire table to further specify particular aspects of the data replication procedure as applied to the table as a whole.

Figure 10:
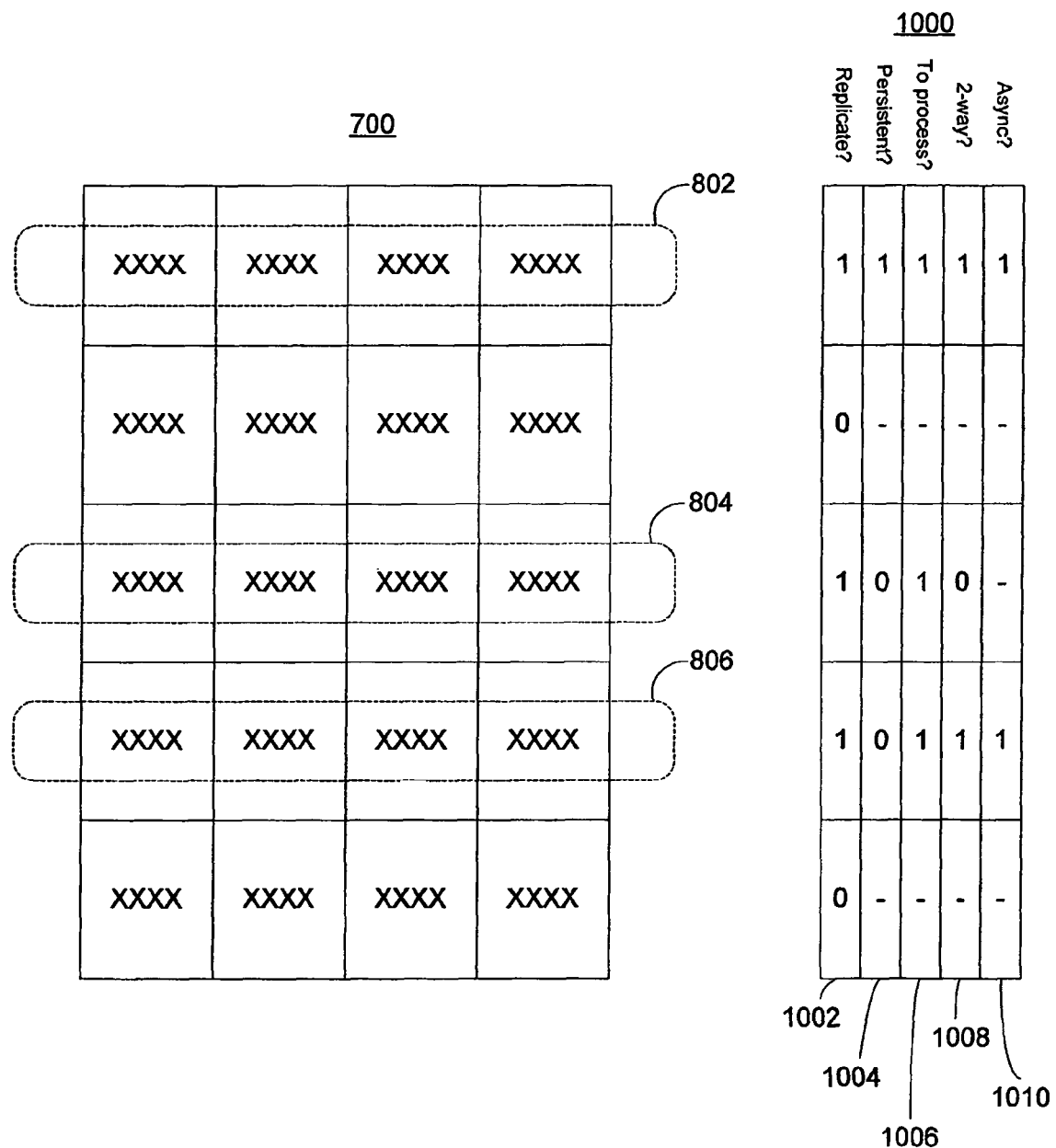
FIG. 10 illustrate a meta data structure containing replication attributes assigned to each row of a data structure, according to one embodiment of the present invention.

FIG. 10 illustrate a meta data structure 1000 containing replication attributes assigned to each row of data structure 700, according to one embodiment of the present invention. Here, rows 802, 804, and 806 of data structure 700 are selected to be replicated from the source device to the destination device, as described previously. In the present embodiment of the invention, meta data structure 1000 includes the same number of rows as data structure 700. For each row of data structure 700, meta data structure 1000 contains a corresponding row of replication attributes specifying properties affecting the replication procedure with respect to that row of data structure 700.

As shown in FIG. 10, each row of meta data structure 1000 includes data from a number of columns 1002, 1004, 1006, 1008, and 1010. Each column contains a replication attribute that may inform the process of replicating data from the source device to the destination device. As depicted in the figure, the replication attributes are specified using Boolean values, such as "1" or "0." Also, certain attributes that are not be specified are indicated using a symbol such as "-." While Booleans are used in this embodiment, other types of values may also be used to specify replication attributes. For example, if a particular attribute can have more than two possible values, an integer value may be used instead of a Boolean. The various replication attributes shown in FIG. 10 are described in further detail below.

Column 1002 relates to a "replicate?" attribute that specifies whether the corresponding row in data structure 700 is to be replicated from the source device to the destination device. This improves the efficiency of the replication procedure by facilitating the replication of only those portions of data that need to be replicated. Data that do not need to be replicated can be left alone. For example, in a redundant system having an active device and a standby device, the addition of a portion of data (referred to here as "parent" data) on the active device may cause the active device to automatically generate additional data (referred to here as "child" data). This may occur as the result of different processes such as simple function calls. If the "parent" data is replicated on the standby device, the standby device may automatically generate the corresponding "child" data on the standby device through similar operations. In such a scenario, it only necessary to replicate the "parent" data from the active device to the standby device. It is not necessary to replicate the "child" data to the standby device, because the standby device can independently generate the "child" data. Indeed, replicating the "child" data to the standby device may decrease the efficiency of replication procedure. The "replicate?" attribute allows identification of those portions of data that are to be replicated and those that are not.

Column 1004 relates to a "persistent?" attribute that specifies whether the corresponding row in data structure 700 is stored as persistent data. A system may store a given section of data in various ways. This may depend on how the system uses the section of data. For example, certain data may be held only as non-persistent data by software processes. Such non-persistent data may be stored within temporary data structures allocated in main memory by a software process as it executes. When the software process terminates, the temporary data structures are no longer available. On the other hand, certain data may be held as persistent data that is stored on some persistent storage device that retains the data even after corresponding software processes terminate. Such a persistent storage device may include a hard disk, RAM disk, or other device. RAM disk refers to software-based storage that emulates the functionality of a hard disk with system RAM. A RAM disk provides faster access to data and can automatically load a disk image from a hard disk and saving the image to hard disk at specified times such as startup or shutdown. Generally speaking, replication of data may include replicating data of different types, including persistent and non-persistent data. The "persistent?" attribute allows explicit specification of whether a particular portion of data is persistent or not, to facilitate consistent replication of data with respect to its persistent characteristics.

Column 1006 relates to a "to process?" attribute that specifies whether the corresponding row in data structure 700 is to be forwarded to a process on the destination device. For example, a process may be a software process that is executing on a CPU of the destination device. Such a software process may need to passed certain data in order to establish proper operations on the destination device. In such a case, the "to process" attribute can specify whether a particular section of data is to be forwarded to a process.

Column 1008 relates to a "2-way?" attribute that specifies whether replication of the corresponding row in data structure 700 involves an acknowledgement relating to receipt of the data at the second network device. This attribute allows indication that the replication procedure includes a step for obtaining feedback, or acknowledgement, regarding the success or failure of the replication of a section of data. That is, instead of only forwarding the replicated data from the source device to the destination device, an acknowledgement is expected at the destination device to indicated whether or not the data is successfully reached the intended destination. This acknowledgement may relate to different portions of the path traveled by the replicated data, depending on implementation. In one embodiment of the invention, the acknowledgement is used locally on the destination device to ensure that a section of data received at the destination device is properly forwarded to the intended software process. In that case, the acknowledgement is generated by the intended software process and received by that portion of the destination device responsible for forwarding the replicated data to the intended software process. In another embodiment, the acknowledgement may be used across the source device and the destination device. In that case, the acknowledgement may be generated at the destination device and received by the source device. The content of the acknowledgement may vary depending on implementation. Just as an example, the acknowledgement message may include an "O.K." message and various error messes indicating different types of error relating to transfer of the replicated data.

Column 1010 relates to an "async" attribute that specifies whether acknowledgement relating to receipt of replicated data from the corresponding row in data structure 700 is handled asynchronously with respect to other acknowledgements. A process that forwards replicated data to a destination may expect an acknowledgement from the destination regarding the success or failure of the delivery of the replicated data. Such a process may forward a number of different sections of replicated data, possibly to different destinations. Thus, it is possible that the process may receive acknowledgement at different times from different destinations. A positive value of the "async?" attribute specifies that such a process is capable of asynchronously handling such acknowledgements. In other words, the process may be able to handle one acknowledgement while waiting for a number of other acknowledgements. On the other hand, a negative value of the "async?" attribute specifies that such a process is not capable of asynchronously handling multiple acknowledgements. In such a case, the process may only deal with one acknowledgement at one time. For example, while waiting for a particular acknowledgement, the process may not be able to handle any other acknowledgement. The choice of asynchronous versus synchronous processing of acknowledgements may vary depending on the specific data being replicated. The "async?" attribute allows this choice to be specified for each individual data section replicated.

While meta data structure 1000 shown in FIG. 10 utilizes individual columns to separately specify each replication attribute, other implementations may be possible. According to an alternative embodiment, predefined values may be specified to represent particular combinations of replication attribute values. For example, a predefined value such as SYNC_ONLY, NO_SYNC, or SYNC_DUMP may be specified for a row of data in data structure 700. The SYNC_ONLY value indicates that the corresponding row of data is to be replicated (e.g., "replicate?"=1), that the data is not non-persistent (e.g., "persistent?"=0), and that the data is to be forwarded to a process on the destination device (e.g., "to process?"=1). The NO_SYNC value indicates that the corresponding row of data is to be replicated (e.g., "replicate?"=1), that the data is persistent (e.g., "persistent?"=1), and that the data is not to be forwarded to a process on the destination device ("to process?"=0). The SYNC_DUMP value indicates that the data is not to be replicated (e.g., "replicate?"=0). For example, the SYNC_DUMP value may be specified for a row of data that represents child data, which does not need to be replicated to the destination device.

FIG. 10 illustrates that replication attributes may be specified for each row of database 700. According to an alternative embodiment of the invention, replication attributes may instead be specified for each column of database 700. For example, a meta data structure may be implemented containing replication attributes assigned to each column of data structure 700 of FIG. 9. For example, columns 902 and 904 of data structure 700 may be selected to be replicated from the source device to the destination device. Correspondingly, the associated meta data structure may include the same number of columns as data structure 700. For each column of data structure 700, this meta data structure may contain a corresponding column of replication attributes specifying properties affecting the replication procedure with respect to that column of data structure 700. Thus, this meta data structure may behave in a manner similar to that of meta data structure 1000, except that replication attributes are specified for columns, instead of rows, of data structure 700.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method of replicating data with a first network device having at least one processor configured to execute instructions for causing the first network device to perform steps of:

systematically assigning a first replication attribute and a second replication attribute to each of a plurality of data sections in a data group comprising point-to-point protocol (PPP) session data accessible to the first network device;

selecting a plurality of data sections from the data group;

determining states of the first and second replication attributes associated with a first data section in the plurality of data sections selected from the data group;

selectively replicating the first data section to a second network device, to create a replicated version of the first data section accessible by the second network device based on the state of the first replication attribute, such that the first data section is replicated when it is determined that the first replication attribute has a first state and not replicated when it is determined that the first replication attribute does not have the first state;

sending information to the second network device for processing the first data section based on the state of the first and second replication attribute, such that the information is sent when it is determined that the first replication attribute has the first state and the second replication attribute has a second state and the information is not sent when it is determined that the first replication attribute does not have the first state or the second replication attribute does not have the second state;

wherein the first network device selectively replicates each data section in the plurality of selected data sections according to a value of the replication attribute associated with said each data section; and wherein processing the first data section comprises an operational software process on the second network device.

2. The method of claim 1 wherein each of the plurality of data sections is a row in a two-dimensional data structure.

3. The method of claim 1 wherein each of the plurality of data sections is a column in a two-dimensional data structure.

4. The method of claim 1 wherein each of the plurality of data sections is a two-dimensional data structure.

5. The method of claim 1 wherein the at least one replication attribute comprises an attribute relating to whether the data section is persistently stored.

6. The method of claim 1 wherein the at least one replication attribute comprises an attribute relating to whether replication of the data section involves an acknowledgement relating to receipt of the data section at the second network device.

7. The method of claim 6 wherein the at least one replication attribute further comprises an attribute relating to whether the acknowledgment is handled asynchronously with respect to other acknowledgements.

8. The method of claim 1 wherein the at least one replication attribute comprises a plurality of replication attributes.

9. The method of claim 1 the at least one replication attribute comprises a predefined value representing a combination of replication attribute values.

10. An apparatus for replicating data from a first network device to a second network device comprising:
a first network device having access to at least one data storage device;
a second network device coupled to the first network device;
wherein the first network device is configured to assign a first replication attribute and a second replication attribute to each data section in a plurality of data sections of a data group comprising point-to-point protocol (PPP) session data and to selectively replicate a selected data section according to a state of the first replication attribute such that the selected data section is replicated when it is determined that the first replication attribute has a first state and not replicated when it is determined that the first replication attribute does not have the first state and to send information to the second network device for processing the first data section based on the state of the first and second replication attribute, such that the information is sent when it is determined that the first replication attribute has the first state and the second replication attribute has a second state and the information is not sent when it is determined that the first replication attribute does not have the first state or the second replication attribute does not have the second state;

wherein the second network device is configured to receive replicated data sections from the first network device and to process each of the received data sections according to the at least one replication attribute assigned by the first network device; and wherein processing the first data section comprises an operational software process on the second network device.

11. The apparatus of claim 10 wherein each data section in the data group comprises a row in a two-dimensional data structure.

12. The apparatus of claim 10 wherein each data section in the data group comprises a column in a two-dimensional data structure.

13. The apparatus of claim 10 wherein each data section in the data group comprises is a two-dimensional data structure.

14. The apparatus of claim 10 wherein the at least one replication attribute comprises an attribute relating to whether the data section is persistently stored.

15. The apparatus of claim 10 wherein the at least one replication attribute comprises an attribute relating to whether replication of the data section involves an acknowledgement relating to receipt of the data section at the second network device.

16. The apparatus of claim 15 wherein the at least one replication attribute further comprises an attribute relating to whether the acknowledgment is handled asynchronously with respect to other acknowledgements.

17. The apparatus of claim 10 wherein the at least one replication attribute comprises a plurality of replication attributes.

18. The apparatus of claim 10 the at least one replication attribute comprises a predefined value representing a combination of replication attribute values.

19. A system for replicating data from a first network device to a second network device, each network device comprising at least one hardware processor, the system comprising:
means for systematically assigning a first replication attribute and a second replication attribute to each of a plurality of data sections in a data group comprising point-to-point protocol (PPP) session data accessible to the first network device;
means for selecting a plurality of data sections from the data group;
means for determining a first state of the first replication attribute and a second state of the second replication attribute associated with a first data section in the plurality of data sections selected from the data group;
means for selectively replicating the first data section to a second network device, to create a replicated version of the first data section accessible by the second network device based on the first state of the first replication attribute, such that the first data section is replicated when it is determined that the first replication attribute has a first state and not replicated when it is determined that the first replication attribute does not have the first state;
means for sending information to the second network device for processing the replicated version of the first data section based on the state of the first and second replication attribute, such that the information is sent when it is determined that the first replication attribute has the first state and the second replication attribute has a second state and the information is not sent when it is determined that the first replication attribute does not have the first state or the second replication attribute does not have the second state;

wherein the first network device selectively replicates each data section in the plurality of selected data sections according to a value of the replication attribute associated with said each data section; and wherein processing the first data section comprises an operational software process on the second network device.

20. The method of claim 1, wherein the data group comprises parent data sections for which the replication attribute has the first state and child data sections for which the replication attribute does not have the first state.

21. The apparatus of claim 10, wherein the data group comprises parent data sections for which the replication attribute has the first state and child data sections for which the replication attribute does not have the first state.

* * * * *